(12) United States Patent
McMeekan

(10) Patent No.: US 9,542,651 B2
(45) Date of Patent: Jan. 10, 2017

(54) FUZZY INFERENCE DEDUCTION USING RULES AND HIERARCHY-BASED ITEM ASSIGNMENTS

(71) Applicant: Healthtrust Purchasing Group, LP, Brentwood, TN (US)

(72) Inventor: Melanie Anne McMeekan, Brentwood, TN (US)

(73) Assignee: HEALTHTRUST PURCHASING GROUP, LP, Brentwood, TN (US)

( * ) Notice: Subject to any disclaimer, the term of this patent is extended or adjusted under 35 U.S.C. 154(b) by 134 days.

(21) Appl. No.: 14/603,152

(22) Filed: Jan. 22, 2015

(65) Prior Publication Data

US 2015/0206059 A1    Jul. 23, 2015

Related U.S. Application Data

(63) Continuation of application No. 14/602,975, filed on Jan. 22, 2015, now Pat. No. 9,256,833.

(60) Provisional application No. 62/106,338, filed on Jan. 22, 2015, provisional application No. 61/930,825, filed on Jan. 23, 2014, provisional application No. 61/930,846, filed on Jan. 23, 2014.

(51) Int. Cl.
| | |
|---|---|
| *G06F 17/00* | (2006.01) |
| *G06N 5/02* | (2006.01) |
| *G06N 5/04* | (2006.01) |
| *G06N 7/02* | (2006.01) |
| *G06F 17/30* | (2006.01) |

(52) U.S. Cl.
CPC ......... *G06N 5/048* (2013.01); *G06F 17/30424* (2013.01); *G06N 5/022* (2013.01); *G06N 7/02* (2013.01)

(58) Field of Classification Search
None
See application file for complete search history.

(56) References Cited

U.S. PATENT DOCUMENTS

| | | | |
|---|---|---|---|
| 5,193,144 A | 3/1993 | Tsutsumi et al. | |
| 5,506,936 A * | 4/1996 | Hisano | G06N 7/04 706/52 |
| 6,385,598 B1 | 5/2002 | Giacalone et al. | |

(Continued)

OTHER PUBLICATIONS

Sanchez, et al. "Genetic learning of fuzzy rules based on low quality data", Fuzzy Sets and Systems 160 (2009) 2524-2552; Received Apr. 9, 2008; received I revised form Mar. 12, 2009; accepted Mar. 16, 2009. Available online Apr. 5, 2009.

*Primary Examiner* — Luis Sitiriche
(74) *Attorney, Agent, or Firm* — Kilpatrick Townsend & Stockton, LLP

(57) ABSTRACT

Some embodiments disclosed herein relate to generating fuzzy inferences of procedure types based on fuzzy logic. Membership functions can be used to relate item variables to a degree of correspondence to various item types. Fuzzy rules can specify processing to be conducted using membership values produced by evaluations of membership functions. An output of the processing can include an inference that a content object corresponding to the item variables relates to one or more procedure types. Further, some embodiments disclosed herein relate to querying hierarchical data structures to identify related items. A hierarchical data structure can associate each of a set of procedure types with one or more item types and/or item identifiers or characteristics.

20 Claims, 7 Drawing Sheets

(56) References Cited

U.S. PATENT DOCUMENTS

| | | | |
|---|---|---|---|
| 7,325,201 B2* | 1/2008 | Ferrari | G06F 17/30864 |
| | | | 707/999.002 |
| 7,827,125 B1* | 11/2010 | Rennison | G06N 99/005 |
| | | | 706/14 |
| 7,917,457 B2 | 3/2011 | Marfatia et al. | |
| 2003/0083717 A1 | 5/2003 | Mlynski et al. | |
| 2004/0102921 A1* | 5/2004 | Tovinkere | G06N 5/04 |
| | | | 706/50 |
| 2006/0064017 A1* | 3/2006 | Krishnan | G06K 9/6282 |
| | | | 600/450 |
| 2009/0150323 A1 | 6/2009 | Hively | |
| 2015/0066944 A1* | 3/2015 | Majidian | G06N 5/048 |
| | | | 707/741 |

* cited by examiner

FUZZY INFERENCE DEDUCTION USING RULES AND HIERARCHY-BASED ITEM ASSIGNMENTS

CROSS-REFERENCE TO RELATED APPLICATIONS

This application is a continuation of U.S. application Ser. No. 14/602,975, filed on Jan. 22, 2015, which claims the benefit of and priority to each of U.S. Provisional Application Ser. No. 62/106,338, filed on Jan. 22, 2015, U.S. Provisional Application No. 61/930,825, filed on Jan. 23, 2014 and U.S. Provisional Application No. 61/930,846, filed on Jan. 23, 2014. Each of these applications is hereby incorporated by reference in its entirety for all purposes.

BACKGROUND

Many analytic techniques center around assumptions that inputs and outputs are exact. However, frequently, applications do not lend themselves to such assumptions. This is particularly true when considering characterizations or categorizations of input values. For example, there is no definite, universal function for determining whether a temperature is "cold". Fuzzy logic provides an opportunity to assess a degree to which a proposition is true. Nonetheless, in many industries, the adoption of fuzzy logic has been limited.

SUMMARY

In some embodiments, a knowledge processing system for generating fuzzy inferences of procedure types based on fuzzy logic is provided. An input receiver accesses a content object. An item-assignment fuzzification engine identifies a set of item variables. Each item variable in the set of item variables can be one identified in the content object. The item-assignment fuzzification engine also accesses one or more membership functions. Each membership function of the one or more membership functions can relate an item variable to a degree of membership for an item type. The item-assignment fuzzification engine can further determine, for each item variable in the set of item variables and using one or more processors, a membership value using the one or more membership functions and the item variable. A fuzzy-logic inference engine accesses a fuzzy ruleset that includes one or more fuzzy rules. Each fuzzy rule in the one or more fuzzy rules can specify a combination of the membership values for the one or more item types via one or more operators or comparison functions. The fuzzy-logic inference engine also generates a fuzzy inference that the content object relates to a procedure type by evaluating at least one fuzzy rule in the fuzzy ruleset using the determined membership values. The fuzzy-logic inference engine further stores an association between the procedure type and a characteristic of the content object.

In some embodiments, a knowledge processing system for querying hierarchical data structures to identify related items is provided. An input receiver accesses a content object that refers to a first item. An item-assignment fuzzification engine identifies, using an extraction technique, a first item identifier corresponding to the first item. A variation engine queries, using one or more processors, a hierarchical item library with the first item identifier. The hierarchical item library identifies a set of procedure types; and for each procedure type in the set of procedure types, a set of item types. The hierarchical item library further identifies, for each item type in the set of item types, one or more item characteristics or item identifiers. The variation engine also receives a query response that identifies a type of item for the first item; a procedure type in the set of procedure types; and a second item identifier associated with the procedure type. An output engine generates an output that identifies a second item that is associated with the second item identifier.

The following detailed description together with the accompanying drawings will provide a better understanding of the nature and advantages of the present invention.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only and is not intended to limit the scope, applicability or configuration of the disclosure. Rather, the ensuing description of the preferred exemplary embodiment (s) will provide those skilled in the art with an enabling description for implementing a preferred exemplary embodiment. It is understood that various changes can be made in the function and arrangement of elements without departing from the spirit and scope as set forth in the appended claims.

In some embodiments, content objects are processed to identify a set of item variables. For example, item identifiers can be extracted from the content objects. Each item variable can be input into each of one or more membership functions. Each membership functions can relate a membership feature to a degree of membership. For example, a membership function may receive as input, an identifier of an item or a parameter or characteristic of a value and output a degree to which it matches a particular item type. A membership function may include a discrete or continuous function. A membership function can include, for example, a linear function, a non-linear function, and/or a look-up function.

For each item variable, a membership value can be determined based on a membership function and the item variable.

A fuzzy ruleset can include one or more fuzzy rules. Each fuzzy rules can specify a combination of membership values via one or more operators and/or comparison functions (e.g., MAX, MIN, AND, NOT or NOT) that can be used to determine, based on whether one or more membership values, whether the combination corresponds to a particular procedure type. For example, a fuzzy rule can indicate that, when each of a particular collection of membership values is above a threshold, that it is to be inferred that the collection corresponds to a particular procedure type. The ruleset can further be structured to distinguish between, for a particular procedure type, a full or partial procedure. A machine learning algorithm can be used to update one or more rules. For example, the machine learning algorithm can compare inferences to known procedure type classifications and adjust membership functions and/or rules.

Figure 1:
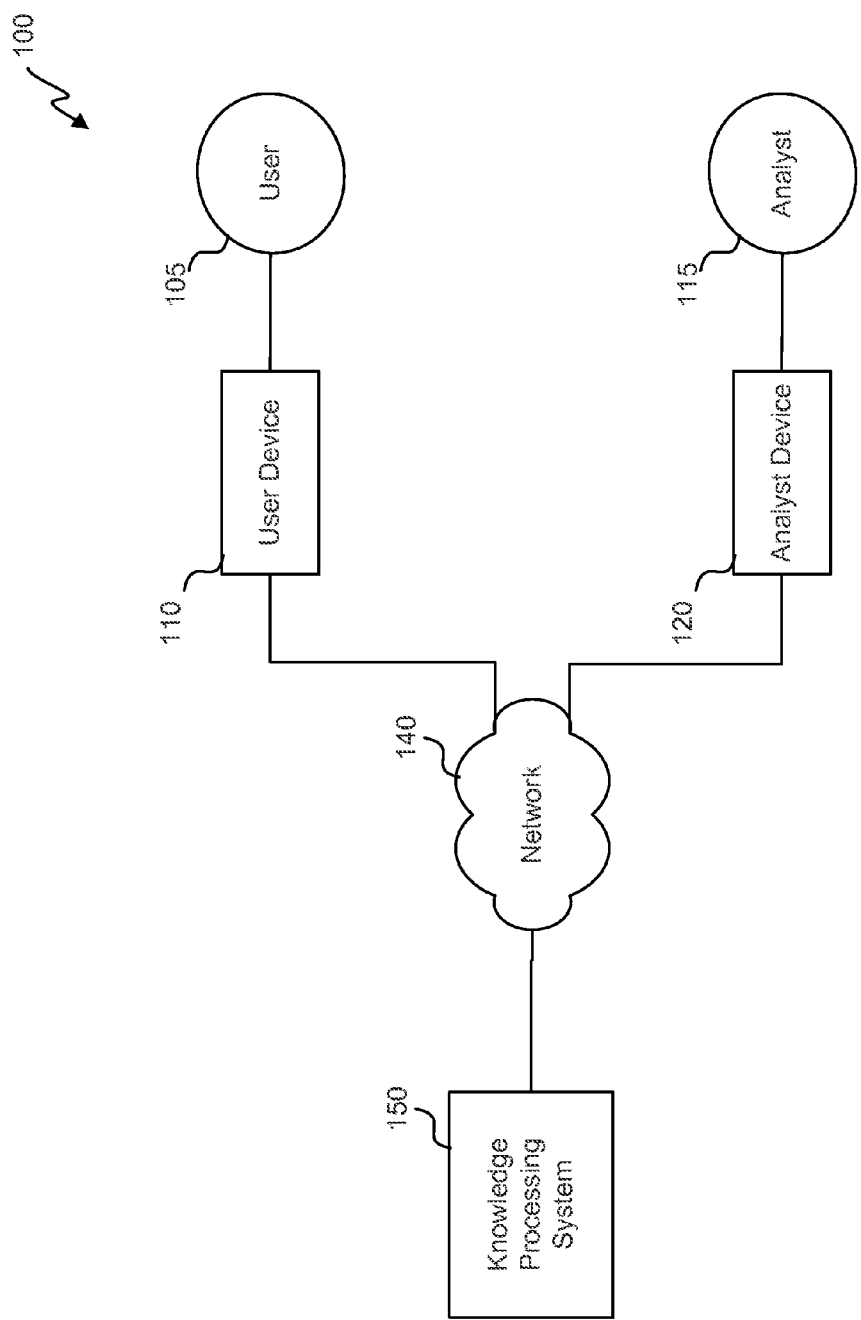
FIG. 1 depicts a block diagram of an embodiment of a knowledge-processing interaction system.

Referring first to FIG. 1, a block diagram of an embodiment of a knowledge processing interaction system 100 is shown. A user 105 and an analyst 115 can interact with a knowledge processing system 150 via respective devices 110 and 120 and a network 140, such as the Internet, a wide area network (WAN), local area network (LAN) or other backbone. In some embodiments, knowledge processing system 150 is made available to one or more of users 105 and/or analysts 115 via an app (that can be downloaded to and executed on a portable electronic device) or a website. It will be understood that, although only one user 105, user device 110, analyst 115, and analyst device 120 are shown, system 100 can include multiple users 105, user devices 110, analysts 115, and/or analyst devices 120.

Users can interact directly with user device 110 and/or indirectly with knowledge processing system 150 or with another system to generate or provide a content object that references or identifies one or more items. The content object can include, for example, a file or an electronic communication. The content object can be, for example, generated or uploaded at user device 110 or generated at knowledge processing system 150 (e.g., based on data received from user device 110). In various instances, the content object includes one that was generated locally at a first device, intercepted by a second device during transmission from the first device to a third device, and/or one that was received from another device. In one instance, the content object includes an electronic request (for provision of one or more items) generated responsive to input provided at user device 110 and sent to knowledge processing system 150.

Knowledge processing system 150 can monitor content objects and track what items are identified in the content object. This tracking can be performed, for example, by extracting data from the content object and/or evaluating one or more membership functions using the data. Knowledge processing system 150 can further identify, for each of one, more or all identified items, an item characteristic and/or entity controlling distribution of and/or access to the item. Such characteristics and/or entity identifiers can be, for example, included in the content object and/or associated with an identifier of the item in a data structure. Knowledge processing system 150 can further identify a user or user device associated with the request or a characteristic thereof.

Upon identifying object-related items and/or membership values, knowledge processing system 150 can evaluate each of one or more rules (e.g., fuzzy rules) to generate an inference as to which procedure type related to the content object. For example, a rule can indicate that it is to be inferred that a content object (or set of items) relate to a particular procedure type when an item identified in the content object or included in the set is of a particular item type and/or when a number of items identified in a content object exceeds a particular threshold. A determination as to whether an item is of a particular item type can be made, for example, by determining whether a membership value matches or corresponds to a comparison value (e.g., 1) and/or exceeds a defined threshold and/or by employing a look-up technique.

In one instance, a rule is structured so as to initially associate each item type corresponding to a content object with one or more procedure types. This association may include a fuzzy or non-fuzzy association. For example, for Item Type A, it may be determined that it is 60% associated with Procedure Type A and 10% associated with Procedure Type B or merely that it is associated with each of Procedure Types A and B. This association can be performed, for example, by looking up an item type in a structure, such as a classification tree. It can then be determined whether an identification of a procedure type is shared across all item types associated with a content object. If so, in some instances, it may be inferred that the content object pertains to that procedure type.

In one instance, evaluating a rule can include evaluating a criterion for each of one or more procedure types. For example, a criterion can specify that Procedure Type A requires items of Item Types A, B and C. Rule evaluation can then include determining whether a content object identifies items of these types (e.g., based on an evaluation of membership values). Depending on the embodiment and/or procedure type, it may be required that all item types have been identified, that a defined portion (e.g., at least two or at least one particular Item Type) have been identified, or that a match value for a procedure type determined based on item-type assessments be higher than corresponding match values for other procedure types. A hierarchy or other technique can be used to address any potential conflicts (e.g., when multiple procedure types are associated with partly or fully overlapping item types).

Further, rule evaluation can include determining whether a content object relates to a full procedure of a given type or a partial procedure. Such determination can include determining whether particular items were identified in the object and/or by determining whether a number of items identified in the object exceeds a threshold. (It will be appreciated that, as used herein, "exceeding a threshold" can include be greater than a defined threshold value, being less than a defined threshold value, being greater than or equal to a defined threshold value, or being less than or equal to a defined threshold value.)

In various embodiments, knowledge processing system 150 can identify a single procedure type or multiple procedure types as being related to a content object. Knowledge processing system 150 can, in some instances, associate each procedure type identified as being related to a content object with a confidence and/or degree of association (e.g., which may be based on how many items of item types within a defined set were identified in an object).

Knowledge processing system 150 can also process a content object to identify one or more items identified in the object that are not associated with or required for a procedure type (e.g., for which it is inferred that the object is related to). Further or alternatively, knowledge processing system 150 can also identify one or more other items or item types that are related to, but not identified in, the content object. For example, knowledge processing system 150 can determine that a content object identifies a first item of a particular type and can then identify a second item of the same type (e.g., and/or being designated as being interchangeable with the first item).

As another example, knowledge processing system 150 may identify an item or item type associated with a particular procedure type but not included in the content object. For example, Procedure Type A may be associated with Item Types A-F. Knowledge processing system 150 may infer that a content object is related to Procedure Type A, based on the object's identification of items of Item Types A-E. Knowledge processing system 150 may then detect the absence of an item of Item Type F.

Various results identified by knowledge processing system 150 may be provided to analyst device 120. For example, knowledge processing system 150 may transmit data to analyst device 120 that identifies, for each of one or more content objects, a procedure type for which it was inferred that the object related to. As another example, knowledge processing system 150 may transmit data that indicates, for a given user, and across a set of content objects associated with the user and inferred to be related to a procedure type: a statistic reflecting a number of items identified in the object; a statistic indicating how frequently an item of each of one or more particular types were identified; and/or a frequency of detection of such object.

Results can be provided to analyst device 120 via, for example, a webpage, app page, email or message. Results can be provided at defined times or time intervals, in response to detecting a new content object or threshold number of content objects (e.g., associated with a particular entity), in response to generating a new result or upon request. In one instance, a processing request can be received from analyst device 120, which can identify a procedure type, user, user affiliation, date range and/or other filter characteristics. In some instances, the processing request can further identify a results-segregation technique (e.g., by user, by user group, by date range, etc.). In response to receiving the processing request, knowledge processing system 150 can retrieve content objects associated with such filter characteristics and process the objects and/or can retrieve previously derived results corresponding to the filter characteristics.

Figure 2:
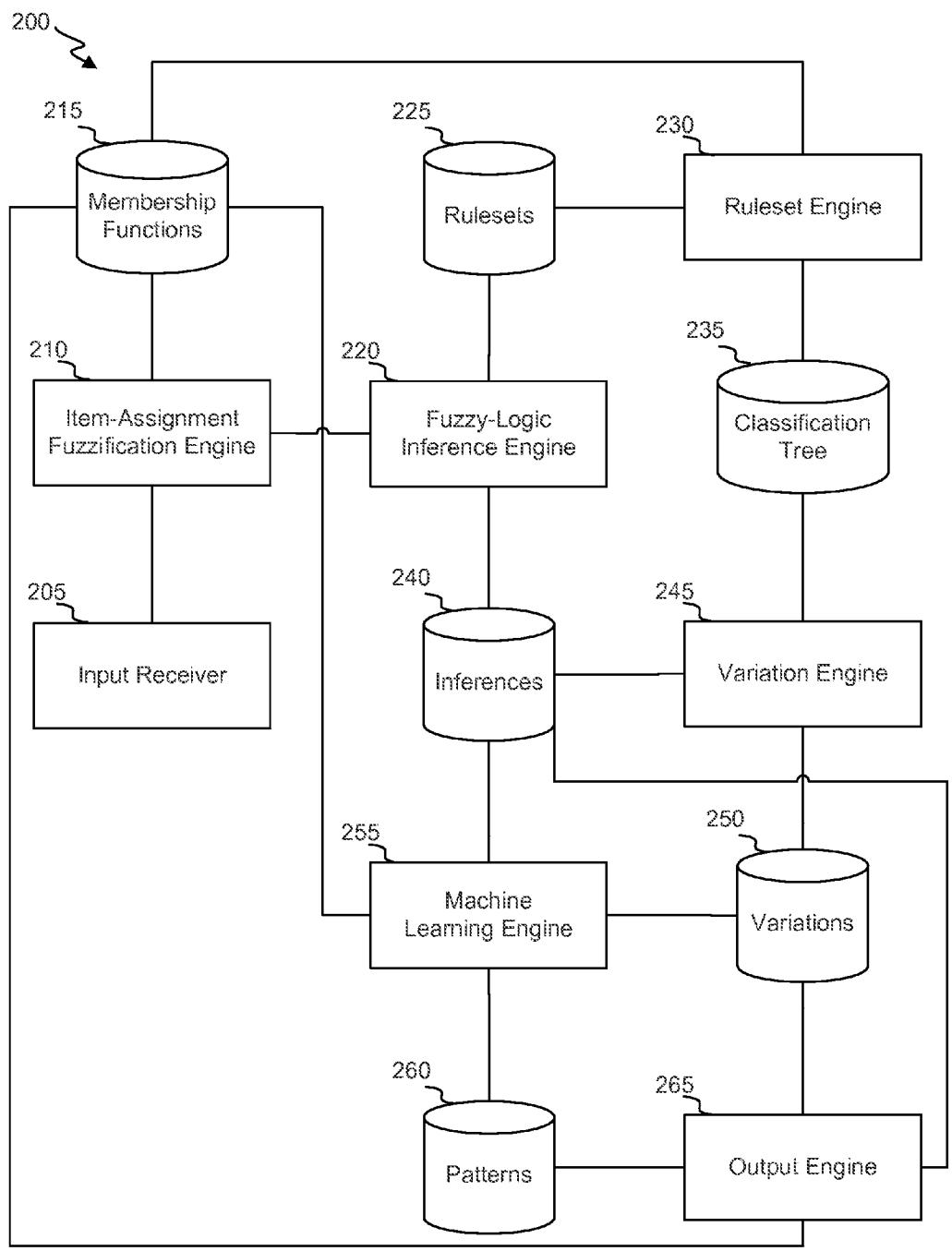
FIG. 2 depicts a block diagram of an embodiment of a knowledge processing system.

FIG. 2 depicts a block diagram of an embodiment of knowledge processing system 150. Knowledge processing system 150 can, for example, reside in a single computing device or server, include reside at least partly or entirely in a cloud server and/or can be distributed across devices.

Knowledge processing system 150 can include an input receiver 205 that can receive content objects. Content objects can be received, for example, from user devices and can include (for example) files, collections of files, file structures, computer codes, communications, and/or electronic requests.

An item-assignment fuzzification engine 210 can identify each of one or more item variables using a received content object. In some instances, a content object includes a set of item variables, and item-assignment fuzzification engine 210 extracts each variable. Extracting the variable can include, for example, detecting any value having a prescribed format or corresponding to a defined field. A variable can include (for example) a code (e.g., an alphanumeric or numeric code), a name or a numeric value. In various instances, a variable can include an identifier of the item and/or parameter or characteristic of the item (e.g., a size). An item can include, for example, a computer program instruction or operation, a media file, a portion of a web address (e.g., domain name) or a physical product or piece of equipment.

Item-assignment fuzzification engine 210 can access one or more membership functions stored in a membership function data store 215. Each membership function in the set of membership functions can relate the item variable to a degree of membership for an item type. For example, a membership function can be configured to receive an item identifier and output a degree of membership for an item type. In one instance, a membership function corresponds to a particular item type, and an output of the function can then indicate whether and/or an extent to which an item identifier corresponds to that type. In one instance, a membership function can pertain to multiple item types, and a membership value can identify a single or multiple item types corresponding to the item identifier (e.g., generally and/or with a numeric indication of a degree to which the item corresponds to the type).

In one instances, a membership function can include and/or depend on an item library that maps item identifiers and/or portions of item identifiers to item types. Thus, a lookup technique can be used to identify an item identifier or item identifier portion within an item library and to then identify each item type associated with the item identifier or portion thereof in the library.

A membership value can, in some instances, correspond to a particular item type and can provide an indication as to whether and/or an extent to which an item corresponds to the particular type. In some instances, a membership value identifies an item type that corresponds to an item.

Evaluation of a membership function that performs a lookup technique using the identifier and library can therefore produce a membership value that is binary or numeric (e.g., within a bounded range or is unbounded) that reflects whether and/or an extent to which the item is associated with a particular type or a membership value that identifies an item type that is associated with the item.

When a content object identifies or is otherwise associated with multiple items, each item can therefore be associated with one or more membership value. For example, for a given item, it may be associated with a single value identifying that it is associated with Item Type A, or it may be associated with a set of multiple values, separately indicating that it is not associated with any of Item Types B-M but is associated with Item Type A.

A fuzzy-logic inference engine 220 can receive a set of membership values, where at least two (or all) of the membership values correspond to different items identified in or otherwise associated with the content object. In one instance, the set reflects a set of item types corresponding to a set of items identified in the content object. Fuzzy-logic inference engine 220 can process the set of membership values using one or more fuzzy rules in a fuzzy ruleset stored in a ruleset data store 225.

A fuzzy rule can be one that relates to categorizations and/or includes categories and/or linguistic variables as inputs or outputs. It will be appreciated that, while fuzzy rules can pertain particular to linguistic variables, in some instances, numbers or other variables are defined to represent linguistic variables (e.g., procedure types and/or item types), such that fuzzy rules may relate to numeric processing and/or outputs and/or non-linguistic variables (e.g., in addition to or instead of processing of linguistic variables and/or generating linguistic outputs).

A fuzzy rule can include one or more operators and/or comparison functions, such as AND, OR, NOT, MIN or MAX. A fuzzy rule can, in some instances, include an if-then structure. For example, a fuzzy rule can include: If each membership value (or a threshold number or percentage) corresponds to an item type associated with a single procedure type, then an output procedure type is to correspond to the procedure type. As another example, a fuzzy rule can include: If each of three particular membership values are detected (e.g., each identifying a particular item type), then an output procedure type is to correspond to a particular procedure type. In a particular instance, this rule could be structured so as to compare a minimum of a set of membership values (each identifying whether an item in a set of items was identified as being of a particular type) to a comparison value (e.g., to determine whether it matches the comparison value and/or exceeds it). To illustrate, Membership Values A, B and C may be defined to be 1 if an item in a set corresponds to Item Type A, B or C, respectively, and 0 otherwise. Therefore, a minimum of these values will be 0 unless all item types are detected.

The ruleset can be defined and/or updated by a ruleset engine 230. Ruleset engine 230 can define and/or update a rule in the ruleset based on, for example, input from an authorized entity, a machine learning technique, and/or other content objects of a same or different type. For example, if a rule or input associates Item Types A and B with Procedure Type A, a machine learning technique may update the rule to further associate Item Type C with Procedure Type A upon detecting a frequency at which content objects include all three Item Types exceeds a threshold (e.g., relative to a frequency at which content objects include Item Types A and B and/or a frequency at which content objects include Item Type C). As another example, inputs (e.g., from a user, analyst or other entity) may associate a content object with a procedure type, such that a machine learning technique can increase a weight between item types in the object and a procedure type. The increased weight can be used to define or update a rule.

In some instances, ruleset engine 230 can define and/or update a rule based on a classification tree 235. A classification tree 235 can include a plurality of nodes arranged into a set of levels. It will be appreciated that, while the connection-based structure lends itself well to a tree data configuration, classification tree 235 may be provided in any of a variety of data configurations (e.g., a table, an array, relational data stores, etc.), so long as associations between various elements (representing procedure types and/or item types) are represented.

At a top level, each node can correspond to a procedure type. In some instances, a lower level can further specify more specific procedure types. Each procedure type (or specific procedure type) can be connected to a lower level that identifies item types associated with that procedure type. In some instances, multiple item-type levels are provided to identify varying degrees of specificity with regard to item type. In some instances, each branch from a top-level procedure type to an end item type (not connected to any lower level) is a same length (in terms of number of node-to-node connections). In some instances, branch lengths can differ (e.g., depending on a number of variations of a procedure type or item type).

In some instances, a connection between a procedure type and an item type is associated with an indication as to whether the item type is required for the procedure type and/or how frequently the item type is used for the procedure type (e.g., based on content-object assessments). In one instance, a rule can be defined based on items' highest ancestors in a tree. For example, a rule can include "Infer Procedure Type A upon detecting an item type corresponding to each of Ancestor Item Type A, B and C" or "Infer any procedure type upon detecting items of all required ancestor item types". Evaluating of a rule may then include mapping a lower level item type to an upper level item type. Classification tree 235 can be generated based on input (e.g., from an authorized entity), a machine learning algorithm (e.g., that processes content objects).

In addition to identifying element connections, classification tree 235 (or another data structure) may include additional data pertaining to individual elements. For example, data can identify that a particular item type is recommended, required, contraindicated, or not permitted for a particular circumstance. As another example, data can identify a preferred or unpreferred source for an item type. Such data may be retrieved and/or provided to an analyst or user upon detecting an item variable for the item type in a content object or assessing such content object.

Fuzzy-logic inference engine 220 can generate a fuzzy inference that a received content object relates to a procedure type by evaluating at least one rule in the ruleset using the determined membership values. Generating the fuzzy inference can include evaluating, for example, one or more if-then statements (e.g., that can include operators and/or comparison functions) or rules of other formats using a set of membership values (e.g., reflecting types of items identified in a content object). For example, the generating can include identifying any and all procedure types for which membership values indicate that items for all associated required item types as identified at classification tree 235 were identified in a content object. As another example, the generating can include identifying a number of items identified in a content object, determining which range the number is within, and identifying a procedure type associated with the range.

In some instances, fuzzy-logic inference engine 220 can generate a (same or additional) inference as to whether the content object relates to a full or partial procedure of the procedure type. This inference can be made according to a rule in the ruleset and can depend, for example, on one or more membership values, whether any item variables for a content object corresponded to one or more particular item types, and/or a quantity of items identified in a content object (e.g., as estimated based on a quantity of item variables and/or membership values having a defined value or exceeding a threshold).

Fuzzy-logic inference engine 220 can store an inference result (e.g., a procedure type and/or full versus partial procedure) in an inference data store 240. The inference result can be stored in association with a characteristic of the content object, such as an identifier of the content object, an identifier of a user and/or user device associated with the content object (e.g., a user device from which the object was received), and/or a time (e.g., at which the content object was received). In some instances, inference data store 240 can further or alternatively store additional information in association with the inference result, such as an entity (e.g., department or institution) associated with a user or with the content object.

A variation engine 245 can use classification tree 235 and/or an inference result to identify one or more potential variations to a set items (and/or corresponding item variable set). Identifying the variation can include first identifying an item type, and second identifying an item of the item type. In one instance, the item type can include one already in the set of items. Identifying the item can include identifying one having a different characteristic than one in the set of items.

In one instance, the identified item type is one not included in the set of items. For example, a set of items includes an item of an item type having a particular ancestor item type (which may or may not be the highest ancestor), and the identified item type can include a different item type having a same ancestor type. As another example, the identified item type can include one associated with an inferred procedure type but that is not identified in a content object. To illustrate, Procedure A may be associated with 4 required item types: Item Types A-D. The content object may identify items of Types A-C, but not D. Identifying the variation can then include detecting that the object lacks an item of type D. When the item type is identified, an item can be selected from amongst multiple items of the identified types based on an item characteristic.

Variation engine 245 can therefore identify a proposed modification to a set of items. The proposed modification may include an additional item (or item type) and/or a replacement of an item (or item type). Variation engine 245 can store the proposed modification in a variation data store 250 in association with an identifier of one or more of a content object, user and/or user device. In some instances, data may further be stored that may reflect a potential effect or potential reason for the modification.

A machine learning engine 255 can process content object characteristics (e.g., associated users, times, etc.), membership results, inference results and/or variations to identify patterns, trends and/or statistics pertaining to various variables (e.g., users, procedure types, and/or time period), which may be stored in a pattern data store 260. Such determinations can be performed, for example, at routine times or time periods or upon receiving a request (e.g., from an analyst and/or identifying one or more variables of interest, such as a procedure type, user and/or institution)

Machine learning engine 255 can identify such patterns, trends and/or statistics using, for example, a machine learning technique, statistical technique, neural network technique, support vector machine technique and/or clustering technique. For example, a statistical technique can be used to identify a percentage of time for which an alternative item of an identified item type was identified for a given entity. As another example, a neural network technique can be used to identify procedure types associated with a proposed modification pertaining to at least a threshold number of item types or a particular item type. As another example, a clustering technique can be used to identify a preferred item characteristic (e.g., material) for particular users.

An output engine 265 can generate an output (e.g., communication or presentation) reflecting data from one or more data stores and/or outputs from one or more engines. For example, an output can identify and/or pertain to one or more item types, inferred procedure types, membership values, patterns (or trends or statistics) and/or proposed modifications associated with each of one or more content objects. An output can be one that is transmitted to a user device or analyst device. An output can pertain to an entity, such as a user or associated department or institution. An output can pertain to one or more procedure types, a defined time period and/or one or more content objects.

In one instance, an output can reflect an inferred procedure type pertaining to each of one or more content objects (e.g. identifying an inferred procedure type for a particular content object or identifying a distribution of inferred procedure types across a set of content objects). In one instance, an output can identify a proposed modification to a set of items associated with a content object (e.g., and a potential effect of adopting the modification). In one instance, an output can reflect, for each of a set of users, an average number of proposed modifications generated for a particular procedure type.

Output engine 265 can facilitate transmission of and/or presentation of the output and/or data within the output. For example, output engine 265 can identify a device or account (e.g., email account) to transmit a communication output to (e.g., a user device associated with a content object or an analyst device having requested part or all of the output) and initiate a transmission to the device.

It will be appreciated that the engines and data structures or stores depicted in FIG. 2 are illustrative, and that other embodiments may include fewer, additional and/or different elements For example, knowledge processing system 200 may include an efficiency engine that uses identifications of item types in a content objects and/or membership values, in view of a rule and/or classification tree 235, to identify an efficiency variable. For example, the efficiency variable may reflect whether, how many and/or which items (e.g., and characteristics thereof) were identified in a content object beyond those required for an inferred procedure type. As another example, the efficiency engine may evaluate variation results generated by variation engine 245 to determine an average cumulative variation between characteristics of content objects' item sets and those in any proposed modifications for a given user or other entity.

Figure 3:
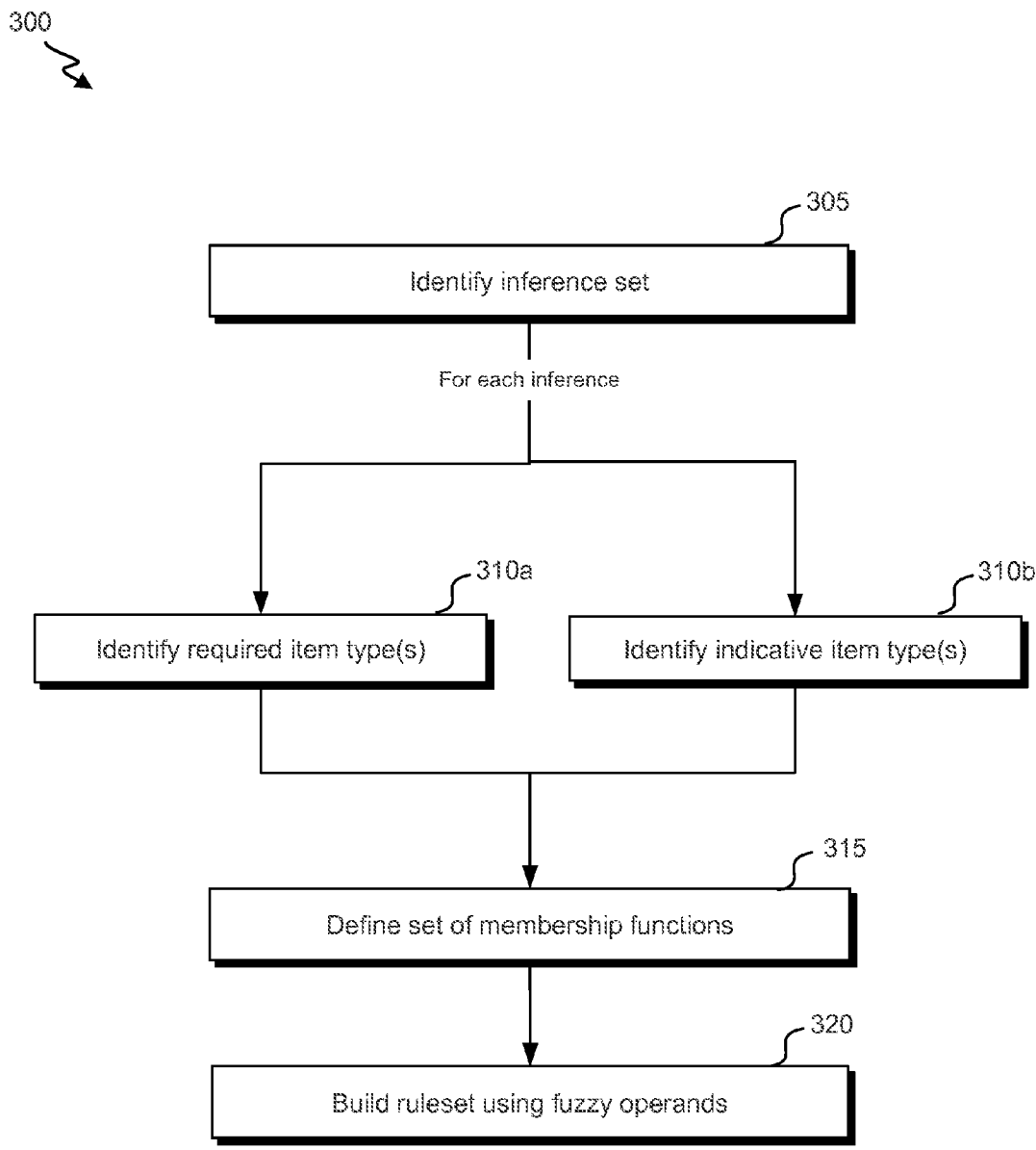
FIG. 3 illustrates a flowchart of an embodiment of a process for defining fuzzy-logic input values for items.

FIG. 3 illustrates a flowchart of an embodiment of a process 300 for defining one or more fuzzy rules and/or defining fuzzy-logic input values for items. Process 300 can be performed in part or in full by knowledge processing system 150.

Process 300 begins at block 305, where ruleset engine 230 identifies an inference set. The inference set can include a plurality of inference results, each of which can include a procedure type and/or whether the procedure is a full or partial procedure. To illustrate, a particular inference set can include 7 inferences: a full procedure of each of Procedure Type 1 and 2, 3 different partial procedures of Procedure Type 1 and 2 different partial procedures of Procedure Type 2.

Each inference in the inference set can be associated with one or more item types. In some instances, a particular inference for a content object (e.g., inferring that the content object relates to a particular procedure type) requires that the content object identify or otherwise be associated with one or more item types (and/or have particular types of identifications or associations with the item types). Thus, at block 310a for a given inference, ruleset engine 230 identifies one or more item types for which content-object identification or association is required to support the inference.

In some instances, a particular inference for a content object may relate to one or more optional item types. An optional item type can include one that is not required for a particular inference (e.g., inferring that a content object is related to a particular procedure type) but that is nonetheless informative in generating such inference. For example, one optional item type may not be required for a given procedure type, but—if such item type is detected in a content object—may itself (or in combination with detection of one or more items of other specified types) indicate that the inference is to be made. To illustrate, items of Item Type K may be exclusively identified in content objects pertaining to Procedure Type D. As another example, one optional item type may be found in content objects pertaining to any of a one or more first inferences, while one or more second inferences may not share associations with the item type. Detection of the item type may therefore weigh against or preclude the one or more second inferences and/or bias towards the one or more first inferences. Thus, at block 310b for a given inference, ruleset engine 230 identifies one or more non-required item types for which content-object identification or association may be indicative of an accuracy of the inference.

In some instances, for a required and/or indicative item type, additional details are identified. For example, a given quantity of the item type may be required, supportive of one or more particular inferences and/or weighing against one or more particular inferences.

At block 315, ruleset engine 230 defined a set of membership functions. Each membership function can, in some instances, correspond to a particular item type and to receive an item variable that corresponds to the particular item type. The item variable can include, for example, part of the content object, such as an item name, item identifier (e.g., a universal, vendor or other item identifier), item material, item size and/or item characteristic. Thus, the item variable may include one selected, entered or otherwise identified by a user associated with the content object. The item variable can include one that is determined, for example, based on a search within or extraction from a content object and/or an input detection technique.

Each of one, more or all membership functions can relate the item variable to membership value corresponding to a degree of membership for an item type. The degree of membership can indicate whether an item of a particular type was identified in or otherwise associated with a content object. For example, a membership value can be 1 if an item of Item Type A was detected and 0 otherwise. As another example, a membership value can be indicative of a confidence that an item type associated with a content object. In one instance, the a membership value indicates a quantity of items of a particular type identified in or otherwise associated with a content object The membership function can include, for example, a look-up technique. For example, a look-up structure may associate each of a set of item variables or components of item variables with one or more potential inferences (e.g., procedure types). The associations may be weighted or unweighted.

In one instance, a membership function is configured to output a binary membership value that indicates whether an item of a particular type (and/or whether a particular quantity of items of the type) was identified in or associated with a content object. In one instance, a membership value reflects a confidence that such an item is to be associated with the content object or a quantity of items of a given type.

At block 320, ruleset engine 230 builds a ruleset that includes one or more fuzzy rules. A fuzzy rule in the one or more fuzzy rules can specify a combination of the membership values. The combination specification can include, for example, identifying one or more particular membership functions, one or more logical operators (e.g., AND, OR, or NOT) or other operators and/or comparison functions (e.g., MIN or MAX) and/or one or more thresholds. For example, a combination specification can include an indication that a minimum of membership values corresponding to Membership Functions A, B and C is to be identified and compared to a threshold of "1" to determine whether it is greater than or equal to the threshold.

In some instances, a fuzzy rule can be structured to generate a particular inference only when one or more item variables indicate that an item of each required item type was associated with a content object. In some instances, a fuzzy rule focuses on item variables that are variable across the inference set. Thus, for example, a rule may not evaluate whether a content object is associated with Item Type A if Item Type A is required for all inferences. In some instances, a fuzzy rule associates a weight with each of one or more item variables. A combination (e.g., sum) of the weighted variables may produce a score for a potential inference in the inference set that may be compared to an absolute threshold or to scores for other potential inferences to determine whether the potential inference is to be adopted.

A combination specification can be included in an IF statement in an IF-THEN function included in a rule, where the then includes a generation of an inference. In one instance, a fuzzy rule specifies when a particular inference is to be made. For example, a fuzzy rule can specify a set of membership values (e.g., via precise values or thresholds) that are to result in a particular inference. In one instance, a fuzzy rule specifies which inference from amongst some or all of the inference set are to be made. Such a rule may include, for example, nested IF statements.

As one example, ruleset 230 may identify, at block 310a, that an inference for a "Full Procedure Type A", Item Types A-D are required. Further, for an inference of "Partial Procedure Type A", no item types may be required, though Item Types A-D may be indicative item types. For each of Item Types A-D, a membership function can be identified at block 315 to generate a membership value a first value when an item variable indicates that a content object identified an item of the item type and a second value otherwise. A first rule in the ruleset can be structured to generate a fuzzy inference of "Procedure Type A" when any of the four membership values are equal to the first value. A second rule in the ruleset can be structured to generate a fuzzy inference of "Full Procedure" when all four membership values are equal to the first value and of "Partial Procedure" otherwise.

In some instances, an inference set, identifications of (required or indicative) inference-related item types, techniques for identifying an item variable for a content object, one or more membership functions and/or one or more rules can be defined based on, for example, input (e.g., from an authorized entity, such as a manager of knowledge processing system 150), a clustering technique, a learning technique, one or more reference documents and/or one or more content objects. For example, one or more authorized entities may identify a set of procedure types, a set of item types required for each procedure type (or each full procedure type) in the set of procedure types and/or associations between individual item identifiers and one or more item types. As another example, a machine learning algorithm can identify a particular item type as being indicative of a particular procedure type upon determining that the item type is frequently identified in content objects identifying other item types associated with the particular procedure type.

It will be appreciated that the depicted embodiment of process 300 (and all depicted processes) is illustrative, and that various modifications are contemplated, such as inclusion of additional actions or fewer actions or modification of depicted actions. For example, process 300 can include an additional action of generating and/or updating a hierarchical item library to associate particular inferences with the identified required and/or indicative types. The associations may indicate whether an item type is required for the procedure type. Further, each item type may be associated with one or more item variables (e.g., item characteristic and/or identifier). The hierarchical item library include, for example, a tree. The library can also include data indicating how frequently various elements are detected or inferred (e.g., how frequently various item types are detected in content objects and/or associated with particular inferences).

Figure 4:
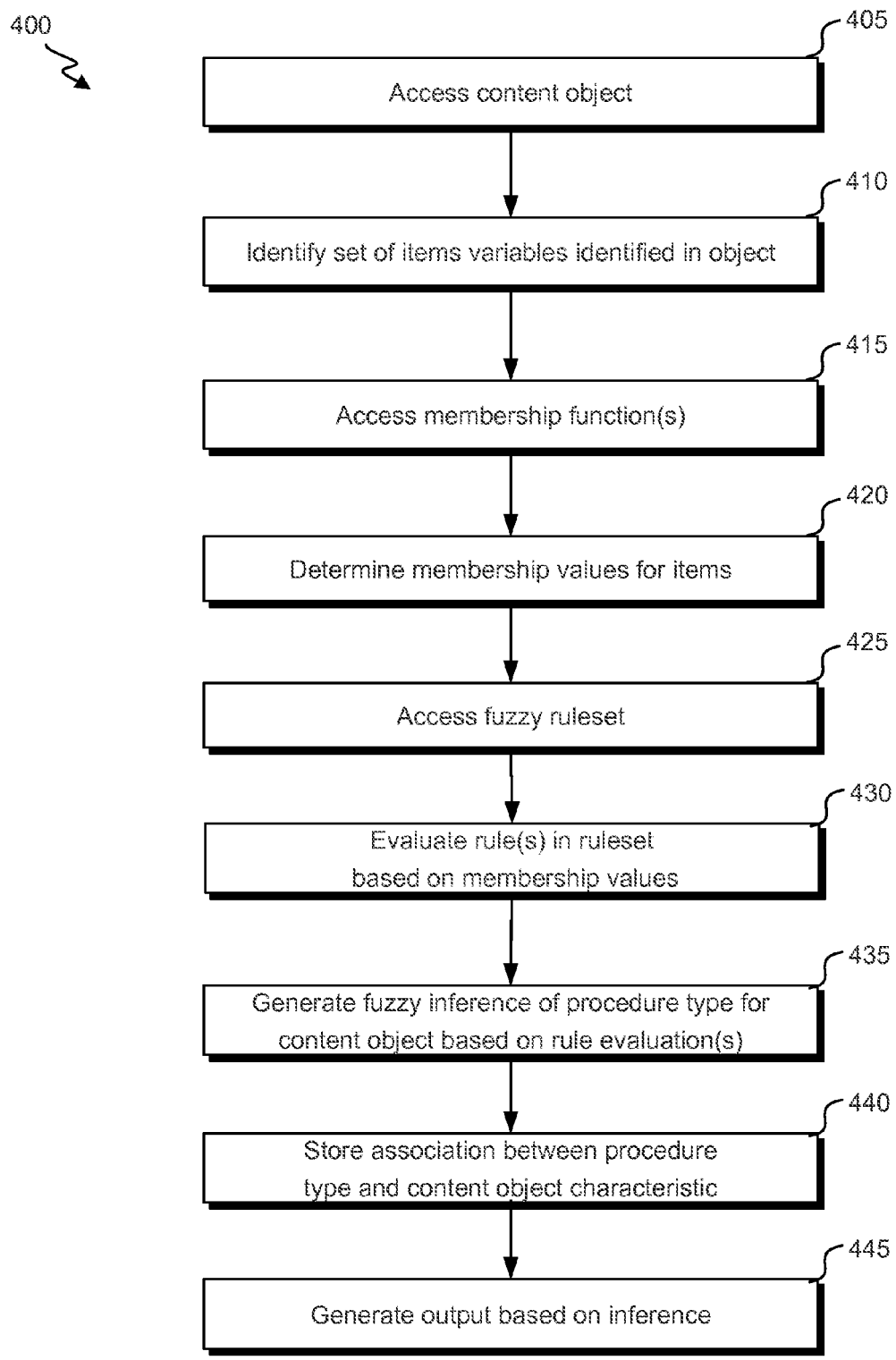
FIG. 4 illustrates a flowchart of an embodiment of a process for generating a fuzzy inference of a procedure type.

FIG. 4 illustrates a flowchart of an embodiment of a process 400 for generating a fuzzy inference of a procedure type. Process 400 can be performed in part or in full by knowledge processing system 150.

At block 405, input receiver 205 accesses a content object. Content objects can be evaluated in process 400, for example, as they are received from one or more other devices (e.g., user devices), at defined times or time intervals, upon receiving an analysis request from an analyst device, or upon receiving a defined number of content objects (e.g., associated with a particular user or entity). A content object can include, for example, a file or communication. In one instance, a content object includes one or more communications where each communication identifies a webpage interaction (e.g., to select an item).

At block 410, item-assignment fuzzification engine 210 identifies a set of item variables, each item variable in the set of item variables being identified in the content object. For example, an item variable can include an item name, item code or other item identifier. Thus, in some instances, each of one, more or all of the set of item variables can identify an item. This specification can include specifying an item type and/or item offer. The item variables can be identified, for example, by detecting data having a defined format, data at defined locations within the content object, data associated with defined field identifiers, etc.

At block 415, item-assignment fuzzification engine 210 accesses one or more membership functions (from membership functions data store 215). Each membership function of the one or more membership functions can relate an item variable to a degree of membership for an item type. Thus, in one instance, evaluation of the set of membership functions using the item variables produces a set of membership values that identify which item types were identified in the content objects. For example, a particular membership value may be associated with a particular item type and may be defined such that its value indicates whether the item type was identified in the content object. As another example, each membership value may have a value that corresponds to an item type (e.g., 1 corresponds to Item Type A, 2 corresponds to Item Type B, etc.). The one or more membership functions can include one or more membership functions defined at block 315 in process 300.

In some instances, a membership function is defined to reference and/or include an item library that identifies, for each item variable, one or more corresponding item types. Thus, a membership function can be structured such that evaluation of the function includes looking up the item variable within the item variable to determine whether the item variable corresponds to a particular item type and/or to identify a corresponding item type.

At block 420, item-assignment fuzzification engine 210 determines, for each item variable in the set of item variables, a membership value using the one or more membership functions and the item variable. In some instances, for each item variable in the set of item variables, at least one membership value and/or an identification of a membership function associated with the membership value can indicate which item type the item variable corresponds to. For example, the set of item variables may include a set of item-identifying codes, and the membership values can identify which item types the item-identifying codes correspond to. The membership values can correspond to a same or different membership functions.

At block 425, fuzzy-logic inference engine 220 accesses a fuzzy ruleset (from ruleset data store 225) that includes one or more fuzzy rules. As used herein, a fuzzy rule can be a rule structured to process one or more inputs (e.g., membership values) and generate an output that includes or is associated with a linguistic variable and/or categorical variable (e.g., a procedure type). The output can include an inferred category pertaining to a content object. The output can be accompanied by other data, such as a confidence metric. In some instances, a fuzzy rule generates multiple output variables (e.g., if it is inferred that a content object relates to multiple procedure types). A fuzzy rulset can include on built at block 320 in process 300.

Each fuzzy rule in the one or more fuzzy rules can specify a combination of the membership values for the one or more item types via one or more operators and/or comparison functions. The one or more operators and/or comparison functions can include arithmetic operators (e.g., +, −, *, /), non-arithmetic operators, logical operators (e.g., AND, OR, or NOT), and/or comparison functions (e.g., MIN or MAX).

In some instances, a fuzzy rule is defined to reference and/or include a hierarchical item library that associates individual potential inferences (e.g., procedure types) with one or more item types and/or the converse. Thus, a fuzzy rule can be structured such that evaluation of the rule includes looking up the item variable within the item variable to determine whether the item variable corresponds to a particular item type and/or to identify a corresponding item type. In some instances, the same hierarchical item library further associates each item type with one or more item variables. In some instances, a different library includes the item variable-to-type associations and/or it is otherwise identified.

As one example, one or more membership functions can be defined to produce an output, for each item variable, identifying which item type from amongst a set of item types the item variable corresponds to (e.g., or an indication if the item variable does not correspond to any item type in the set of item types). A ruleset can be defined to generate an inference that the content object is related to a particular procedure type whenever one or more specific item types associated with the procedure type (e.g., in a hierarchical item library) are identified. Further, it can be inferred that the procedure type is a full procedure type when each of a set of particular item types are identified (or when at least a threshold number of particular item types are identified) and inferred that the procedure is a partial procedure otherwise.

At block 430, fuzzy-logic inference engine 220 evaluates at least one fuzzy rule in the fuzzy ruleset using the determined membership values. The rule evaluation can include, for example, determining whether a particular membership value is (or is at least) a specified value, whether any of multiple membership values is (or is at least) a specified value, whether all of multiple membership values is (or is at least) a specified value, determining which membership values are (or are at least) a specified value, identifying a procedure type (or other potential inference) associated with each of one or more membership values and/or identifying (based on the membership values) a quantity of item types in general or of particular item types identified in the content object.

In some instances, the evaluation can include determining a quantity of items for which an item-assignment condition is satisfied based on membership values associated with the item. For example, each of a set of membership functions may be structured to output a count of all items identified in a content object corresponding to a given type. The item-assignment condition can then specify that a membership value is to be greater than zero (and/or specify further constraints, such as limits to what item types are to be considered). The quantity can then be a sum of the outputs of the membership functions. As another example, a membership function can be structured to output a count of all items identified in a content object, and the quantity of items can then include that output. The number of items (or items of one or more types) may be indicative of a procedure type. Accordingly, a fuzzy rule can include comparing the quantity of items to one or more thresholds. Particular procedures may be associated with, for example, determining that the quantity is above a threshold. Below a threshold or within a given range.

In some instances, a procedure type is associated with a set of item types and/or a set of membership values reflecting identification of items in the set of item types in a content object. Depending on the embodiment, an inference that a content object may require that all item types in the set of item types be identified in the content object (and/or that membership values reflect such identifications). In some instances, however, such inference can be supported upon (for example) merely detecting that one or more particular item types in the set were identified or that a threshold number of item types in the set were identified (and/or detecting corresponding membership values). Which and/or how many item types were detected (and/or which membership values matched or exceeded a threshold) may be used to infer (in a same or different inference) whether the procedure type related to the content object is a full or partial procedure. For example, it may inferred that the procedure type is a full procedure only when an item for each item type in a set of item types (e.g., required for the procedure) is detected or when a quantity of detected item types (amongst those identified in a set of procedure-related item types) exceeds a threshold.

A result of such evaluation can be associated with a particular inference from an inference set (e.g., a procedure type). Thus, at block 435, fuzzy-logic inference engine 220 generates a fuzzy inference that the content object relates to a procedure type based on the evaluation.

At block 440, fuzzy-logic inference engine 220 stores an association between the procedure type and a characteristic of the content object in inference data store 240. The characteristic can include, for example, an identifier of the content object, an identifier of a user associated with the content object (e.g., having provided input reflected in data in the content object), an identifier of a user device associated with the content object (e.g., having sent the content object) and/or one or more other entities associated with the content object (e.g., an institution and/or department that a user is associated with).

At block 445, output engine 265 generates an output based on the inference. The output may relate to a single content object accessed at block 405 or a set of content objects (e.g., each of which may have been assessed via actions specified in blocks 405-440). For example, the output may identify a characteristic of the content object, a set of item types identified in the content object (e.g., as determined based on membership values) and an inferred procedure type. As another example, an output may specify a distribution of inferences made across a set of content objects associated with a single user and/or a distribution or count of item types (e.g., as determined based on membership values) associated with each of one or more of the inferences. The output can include a presentation or communication and may be transmitted to another device (e.g., a user device or analyst device).

It will be appreciated that the depicted embodiment of process 400 (and all depicted processes) is illustrative, and that various modifications are contemplated, such as inclusion of additional actions or fewer actions or modification of depicted actions. For example, process 400 can include an additional action of identifying one or more surplus items and/or surplus item types identified in or otherwise associated with a content objects. A surplus item can include an item corresponding to a surplus item type. A surplus item type can include one not required to perform a procedure of an inferred procedure type and/or identified (generally, or in association with the inferred procedure type) as being a surplus item type. In one instance, a surplus item is one ordered beyond a defined quantity. For example, identifying up to two of a particular item type may not result in a surplus detection, whereas each item of the item type beyond two may be flagged as a surplus item. For each surplus item or item type, a surplus variable can be identified, which may be a single count for each surplus item or may reflect a cost of the item. A cumulative surplus variable can be generated for the content object to reflect a sum of all surplus variables. A surplus variable may further or alternatively reflect other efficiency characteristics of a content object, such as how an item characteristic of a selected item compares to item characteristics of other items of a same item type. The output can further identify the surplus item, one or more surplus variables and/or a cumulative surplus variable.

Figure 5:
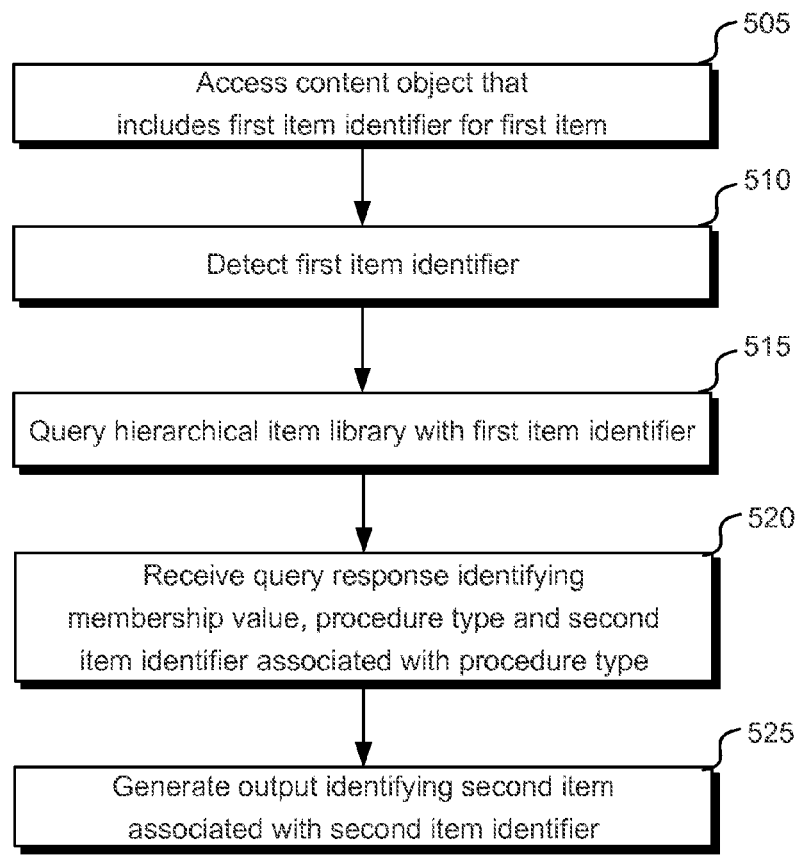
FIG. 5 illustrates a flowchart of an embodiment of a process for querying hierarchical data structures to identify related items.

FIG. 5 illustrates a flowchart of an embodiment of a process for querying hierarchical data structures to identify related items. Process 500 can be performed in part or in full by knowledge processing system 150.

At block 505, input receiver 205 accesses a content object. A content object can include, for example, a file or communication. In one instance, a content object includes one or more communications where each communication identifies a webpage interaction (e.g., to select an item). The content object can include a first item identifier for each of one or more first items. The first item identifier can include, for example, an item name, item code and/or other item identifier (e.g., an indication that a selection had been made in association with a particular item field). In some (though not other) instances, an item identifier can include an identifier of an item type.

At block 510, item-assignment fuzzification engine 210 identifies the first item identifier. The first item identifier can be identified using an extraction technique, which can (for example) extract data that corresponds to a field identifier, is located at a particular position in the content object, and/or is of a particular format. The first item identifier can be identified as part of an action to detect all item identifiers for the content object.

At block 515, variation engine 245 queries a hierarchical item library with the first item identifier. The hierarchical item library can include one defined, for example, in part or in its entirety (for example) based on user input, input from an entity and/or usage patterns. The hierarchical item library can include a dynamic library that is periodically or routinely updated. The hierarchical item library can include a general library, a library specific to a user or other entity (e.g., institution or department), use application and/or time period.

The hierarchical item library can identify a set of procedure types (e.g., in one or more first levels). In some instances, procedure types can be identified within a set of first levels. For example, procedure types on a lower level in the set of first levels may be sub-types of a procedure type in a higher level in the set of first levels.

For each or one, more or all procedure types in the set of procedure types, the hierarchical item library can identify a set of associated item types (e.g., in one or more second levels). In some instances, item types can be identified within a set of second levels. For example, lower levels can segregate an item type based on whether it is reversible, whether it is modular, a material, a size, whether it is coated and/or an appropriate use case. In some instances, an association between a procedure type and an item type can indicate whether an item type is required or optional for a procedure of the procedure type (or such data may be identified elsewhere).

For each of one, more or all item types in the set of item types, the hierarchical item library can identify a set of item identifiers associated with the item type.

It will be appreciated that, in some instances the hierarchical item library can have a structure of a classification tree. For example, a representation of a procedure type can branch into representations of multiple item types, each of which can branch into representations of multiple item identifiers. Other structures are contemplated. For example, a classification tree can associate procedure types with item types, and an array or database can associate individual items with one or more item types. Thus, in some instances, the hierarchical item library can include multiple structures, each of which may have same, similar or different structure types.

In some instances, an association of an item with one lower level item type can serve to further associate the item with each upper level item type associated with the lower level item type and/or with each procedure type associated with the upper and/or lower level item type(s). Similarly, an association of an item type with one lower level procedure type can serve to further associate the item type with each upper level procedure type associated with the lower level procedure type.

Querying the hierarchical item library with the first item identifier can allow for one or more item types and/or procedure types associated with the first item identifier to be identified. In instances in which procedure types, item types and item identifiers are arranged within a classification tree, item types and/or procedure types associated with the first item identifier can include ones that are represented as ancestors to a representation of the first item identifier in the tree.

At block 520, variation engine 245 receives a query response. The query response can identify a type of item for the first item. The type of item can correspond to an item type associated with the item identifier (e.g., via a link, shared index, and/or other association) in the hierarchical item library. For example, a representation of the type of item can be an ancestor to the first item identifier in a classification tree.

The query response can also or alternatively identify a procedure type. The procedure type can correspond to one associated with the item identifier and/or identified type of item (e.g., via a link, shared index, and/or other association) in the hierarchical item library. For example, a representation of the procedure type can be an ancestor to the first item identifier and/or procedure type in a classification tree.

The query response can also or alternatively identify a second item identifier for a second item associated (in the hierarchical item library) with the procedure type. In some instances, each of the first and second item identifiers corresponds to a same item type. The second item may have one or more preferred characteristics over the first item though. In one instance, the second item is identified by evaluating each of a set of items associated with the item type and selecting one associated with a characteristic exceeding a threshold and/or extreme from amongst characteristics of the item set.

In one instance, the second item is more strongly associated with the item type (and thus the procedure type) than the first item. A weight of an association may reflect, for example, how frequently the item is identified in content object (e.g., generally, during a defined recent time period, by a given user, by users associated with a particular institution or department, etc.).

In one instance, the first item and the second item correspond to different item types but nonetheless with a same procedure type. The second item type may be associated with an item type required for the procedure type and/or one frequently identified in content objects identifying the first item or an item of a type associated with the first item (e.g., at a frequency above a defined threshold).

In one instance, the first item and the second item correspond to a same ancestoral item type but a different child item type. The second item may be associated with a child item type determined to be preferable to one associated with the first item. For example, a child type associated with the second item may be identified as having a higher compatibility with one or more other items (or associated item types) in the content object as compared to a child type associated with the first item.

When the second and first items are of different item types, the second item can include one selected from amongst a set of items corresponding to a particular second type. The second item can be selected, for example, based on a frequency at which individual items are identified in content objects (e.g., generally, during a defined recent time period and/or across content objects associated with a given user or entity) or an item characteristic.

At block 525, output engine 265 can generate an output identifying a second item associated with the second item identifier and/or identifying the second item identifier. In some instances, the output can identify a procedure type associated with the second item. In some instances, the output can indicate that the second item is proposed or recommended (e.g., in lieu of the first item). In some instances, the output can include one transmitted to another device (e.g., a user device or analyst device).

It will be appreciated that various modifications to process 500 are contemplated. For example, one or more of blocks 505-525 may be repeated for other item identifiers. As another example, process 500 can be expanded to include an action of generating an inference of a procedure type associated with a content object. The second item can include one associated with and/or required for the procedure type. As yet another example, an additional action of modifying the hierarchical item library based on the query can be added to process 500.

As still another example, process 500 can be modified to include an additional action of modifying the hierarchical item library based on the query and/or query response. For example, the hierarchical item library can include additional data associated with individual elements (e.g., representations of procedure types, item types and/or items; and/or associations between procedure types and item types or item types and items). The additional data can identify, for example, associated prevalence (e.g., generally, for an associated user or other entity, and/or for a defined time period), estimated or actual cost (or cost range), and/or procedure results (e.g., statistics). The additional data can be updated to reflect how frequently a particular item was identified in a content object inferred to be related to, for example, a particular procedure type and/or how frequently a particular item was selected from amongst other items of a given type.

Figure 6:
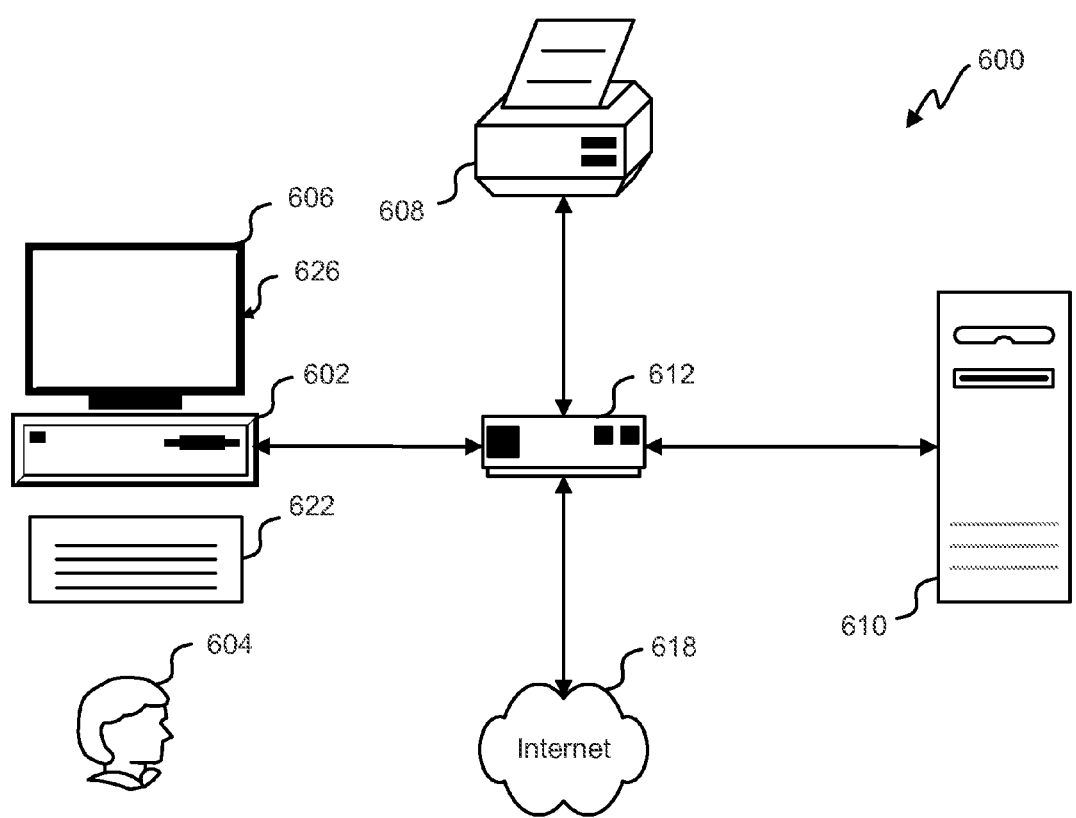
FIG. 6 depicts a block diagram of an embodiment of a computer system.

Referring next to FIG. 6, an exemplary environment with which embodiments can be implemented is shown with a computer system 600 that can be used by a designer 604 to design, for example, electronic designs. The computer system 600 can include a computer 602, keyboard 622, a network router 612, a printer 608, and a monitor 606. The monitor 606, processor 602 and keyboard 622 are part of a computer system 626, which can be a laptop computer, desktop computer, handheld computer, mainframe computer, etc. Monitor 606 can be a CRT, flat screen, etc.

A designer 604 can input commands into computer 602 using various input devices, such as a mouse, keyboard 622, track ball, touch screen, etc. If the computer system 600 comprises a mainframe, a designer 604 can access computer 602 using, for example, a terminal or terminal interface. Additionally, computer system 626 can be connected to a printer 608 and a server 610 using a network router 612, which can connect to the Internet 618 or a WAN.

Server 610 can, for example, be used to store additional software programs and data. In one embodiment, software implementing the systems and methods described herein can be stored on a storage medium in server 610. Thus, the software can be run from the storage medium in server 610. In another embodiment, software implementing the systems and methods described herein can be stored on a storage medium in computer 602. Thus, the software can be run from the storage medium in computer system 626. Therefore, in this embodiment, the software can be used whether or not computer 602 is connected to network router 612. Printer 608 can be connected directly to computer 602, in which case, computer system 626 can print whether or not it is connected to network router 612.

Figure 7:
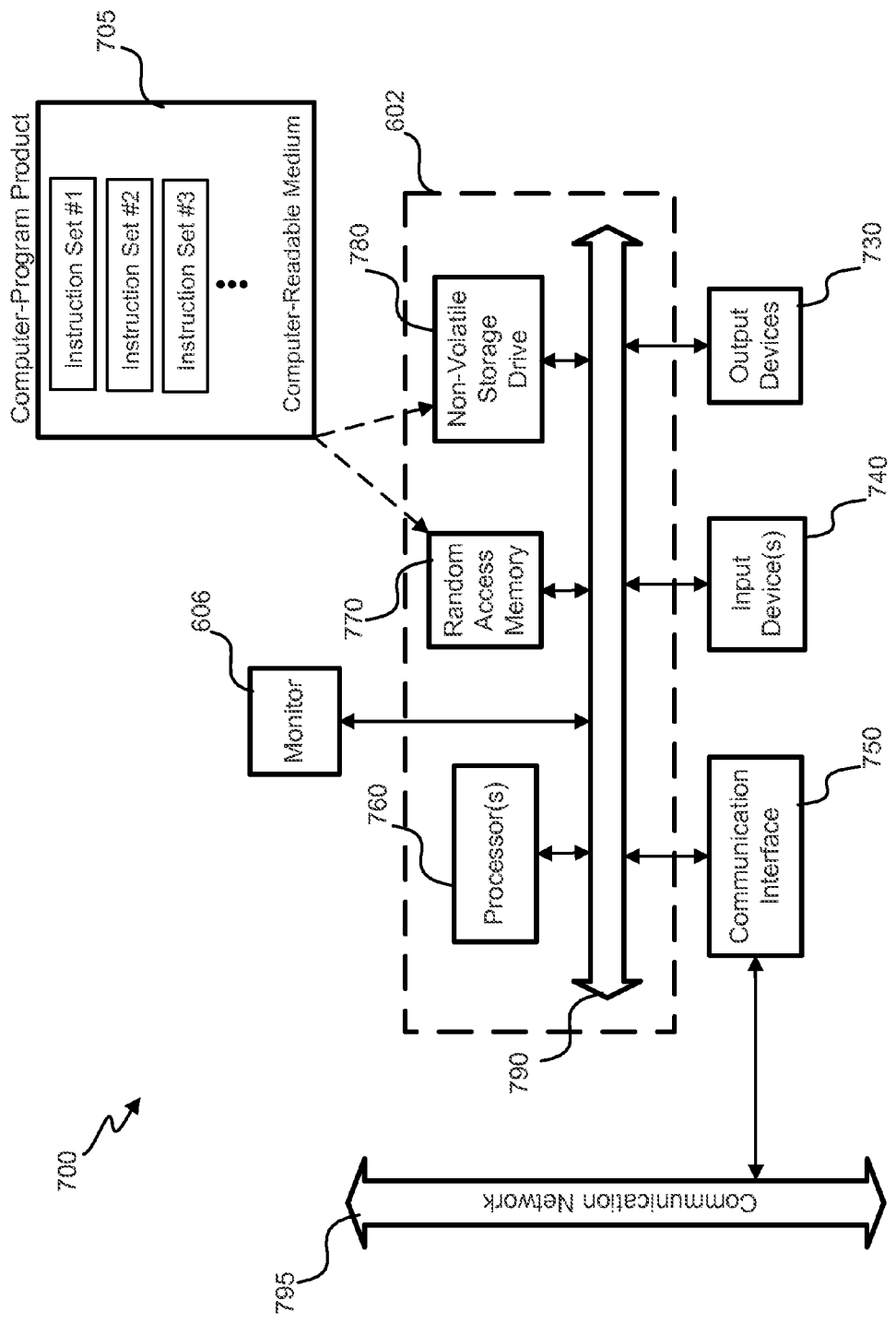
FIG. 7 depicts a block diagram of an embodiment of a special-purpose computer system.

With reference to FIG. 7, an embodiment of a special-purpose computer system 700 is shown. A computing system configured to perform part or all flowcharts or methods described herein (or combinations thereof) are examples of a special-purpose computer system 700. Thus, for example, one or more special-purpose computer systems 700 can be used to provide the function of knowledge processing system 150 and/or one or more engines or components thereof. The above methods can be implemented by computer-program items that direct a computer system to perform the actions of the above-described methods and components. Each such computer-program item can comprise sets of instructions (codes) embodied on a computer-readable medium that directs the processor of a computer system to perform corresponding actions. The instructions can be configured to run in sequential content object, or in parallel (such as under different processing threads), or in a combination thereof. After loading the computer-program items on a general purpose computer system 626, it is transformed into the special-purpose computer system 700.

Special-purpose computer system 700 comprises a computer 602, a monitor 606 coupled to computer 602, one or more additional user output devices 730 (optional) coupled to computer 602, one or more user input devices 740 (e.g., keyboard, mouse, track ball, touch screen) coupled to computer 602, an optional communications interface 750 coupled to computer 602, a computer-program item 705 stored in a tangible computer-readable memory in computer 602. Computer-program item 705 directs system 700 to perform the above-described methods. Computer 602 can include one or more processors 760 that communicate with a number of peripheral devices via a bus subsystem 790. These peripheral devices can include user output device(s) 730, user input device(s) 740, communications interface 750, and a storage subsystem, such as random access memory (RAM) 770 and non-volatile storage drive 780 (e.g., disk drive, optical drive, solid state drive), which are forms of tangible computer-readable memory.

Computer-program item 705 can be stored in non-volatile storage drive 790 or another computer-readable medium accessible to computer 602 and loaded into memory 770. Each processor 760 can comprise a microprocessor, such as a microprocessor from Intel® or Advanced Micro Devices, Inc®, or the like. To support computer-program item 705, the computer 602 runs an operating system that handles the communications of item 705 with the above-noted components, as well as the communications between the above-noted components in support of the computer-program item 705. Exemplary operating systems include Windows® or the like from Microsoft Corporation, Solaris® from Sun Microsystems, LINUX, UNIX, and the like.

User input devices 740 include all possible types of devices and mechanisms to input information to computer system 602. These can include a keyboard, a keypad, a mouse, a scanner, a digital drawing pad, a touch screen incorporated into the display, audio input devices such as voice recognition systems, microphones, and other types of input devices. In various embodiments, user input devices 740 are typically embodied as a computer mouse, a trackball, a track pad, a joystick, wireless remote, a drawing tablet, a voice command system. User input devices 740 typically allow a user to select objects, icons, text and the like that appear on the monitor 606 via a command such as a click of a button or the like. User output devices 730 include all possible types of devices and mechanisms to output information from computer 602. These can include a display (e.g., monitor 606), printers, non-visual displays such as audio output devices, etc.

Communications interface 750 provides an interface to other communication networks and devices and can serve as an interface to receive data from and transmit data to other systems, WANs and/or the Internet 618. Embodiments of communications interface 750 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 750 can be coupled to a computer network, to a FireWire® bus, or the like. In other embodiments, communications interface 750 can be physically integrated on the motherboard of computer 602, and/or can be a software program, or the like.

RAM 770 and non-volatile storage drive 780 are examples of tangible computer-readable media configured to store data such as computer-program item embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 770 and non-volatile storage drive 780 can be configured to store the basic programming and data constructs that provide the functionality of various embodiments of the present invention, as described above.

Software instruction sets that provide the functionality of the present invention can be stored in RAM 770 and non-volatile storage drive 780. These instruction sets or code can be executed by processor(s) 760. RAM 770 and non-volatile storage drive 780 can also provide a repository to store data and data structures used in accordance with the present invention. RAM 770 and non-volatile storage drive 780 can include a number of memories including a main random access memory (RAM) to store of instructions and data during program execution and a read-only memory (ROM) in which fixed instructions are stored. RAM 770 and non-volatile storage drive 780 can include a file storage subsystem providing persistent (non-volatile) storage of program and/or data files. RAM 770 and non-volatile storage drive 780 can also include removable storage systems, such as removable flash memory.

Bus subsystem 790 provides a mechanism to allow the various components and subsystems of computer 602 communicate with each other as intended. Although bus subsystem 790 is shown schematically as a single bus, alternative embodiments of the bus subsystem can utilize multiple busses or communication paths within computer 602.

Specific details are given in the above description to provide a thorough understanding of the embodiments. However, it is understood that the embodiments can be practiced without these specific details. For example, circuits can be shown in block diagrams in content object not to obscure the embodiments in unnecessary detail. In other instances, well-known circuits, processes, algorithms, structures, and techniques can be shown without unnecessary detail in content object to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments can be described as a process which is depicted as a flowchart, a flow diagram, a data flow diagram, a structure diagram, or a block diagram. Although a flowchart can describe the operations as a sequential process, many of the operations can be performed in parallel or concurrently. In addition, the content object of the operations can be re-arranged. A process is terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks can be stored in a machine readable medium such as a storage medium. A code segment or machine-executable instruction can represent a procedure, a function, a subprogram, a program, a routine, a subroutine, a module, a software package, a script, a class, or any combination of instructions, data structures, and/or program statements. A code segment can be coupled to another code segment or a hardware circuit by passing and/or receiving information, data, arguments, parameters, and/or memory contents. Information, arguments, parameters, data, etc. can be passed, forwarded, or transmitted via any suitable means including memory sharing, message passing, ticket passing, network transmission, etc.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A knowledge processing system for querying hierarchical data structures to identify related items, the knowledge processing system comprising:
   an input receiver that accesses a content object that refers to a first item;
   an item-assignment fuzzification engine that identifies, using an extraction technique, a first item identifier corresponding to the first item;
   a variation engine that:
      queries, using one or more processors, a hierarchical item library with the first item identifier, the hierarchical item library identifying:
         a set of procedure types; and
         for each procedure type in the set of procedure types:
            a set of item types;
            for each item type in the set of item types, one or more item characteristics or item identifiers; and
            identifying, as a result of using machine learning, at least one item type in the set of item types as indicative of a particular procedure type in the set of procedure types; and
      receives a query response that identifies:
         a type of item for the first item;
         a procedure type in the set of procedure types; and
         a second item identifier associated with the procedure type; and
   an output engine that generates an output that identifies a second item that is associated with the second item identifier.

2. The knowledge processing system for querying hierarchical data structures to identify related items as recited in claim 1, wherein the second item is of the type of item for the first item such that both the first item and the second item are of a same type.

3. The knowledge processing system for querying hierarchical data structures to identify related items as recited in claim 1, wherein the query response indicates that a weight of an association between the second item and the procedure type is stronger than a weight of an association between the first item and the procedure type.

4. The knowledge processing system for querying hierarchical data structures to identify related items as recited in claim 1, wherein:
the content object refers to a first set of items, the first set of items including the item;
the item-assignment fuzzification engine further identifies, using the extraction technique, a first set of item identifiers, each item identifier in the first set of item identifiers corresponding to a first item in the set of first items;
the variation engine further queries the hierarchical item library with the first set of item identifier, the hierarchical item library identifying; and
the query response or another query response identifies a procedure type corresponding to each first item in the set of first items.

5. The knowledge processing system for querying hierarchical data structures to identify related items as recited in claim 4, further comprising:
a fuzzy-logic inference engine that generates a fuzzy inference that the content object relates to a particular procedure type based on the procedure type corresponding to each of multiple first items in the set of first items.

6. The knowledge processing system for querying hierarchical data structures to identify related items as recited in claim 1, wherein the hierarchical item library is dynamic and repeatedly adjusted based on queries.

7. The knowledge processing system for querying hierarchical data structures to identify related items as recited in claim 1, wherein the output engine further transmits the output to another device.

8. A computer-implemented method for querying hierarchical data structures to identify related items, the method comprising:
accessing a content object that refers to a first item;
identifying, using an extraction technique, a first item identifier corresponding to the first item;
querying, using one or more processors, a hierarchical item library with the first item identifier, the hierarchical item library identifying:
a set of procedure types; and
for each procedure type in the set of procedure types:
a set of item types;
for each item type in the set of item types, one or more item characteristics or item identifiers; and
identifying, as a result of using machine learning, at least one item type in the set of item types as indicative of a particular procedure type in the set of procedure types;
receiving a query response that identifies:
a type of item for the first item;
a procedure type in the set of procedure types; and
a second item identifier associated with the procedure type; and
generating an output that identifies a second item that is associated with the second item identifier.

9. The computer-implemented method for querying hierarchical data structures to identify related items as recited in claim 8, wherein the second item is of the type of item for the first item such that both the first item and the second item are of a same type.

10. The computer-implemented method for querying hierarchical data structures to identify related items as recited in claim 8, wherein the query response indicates that a weight of an association between the second item and the procedure type is stronger than a weight of an association between the first item and the procedure type.

11. The computer-implemented method for querying hierarchical data structures to identify related items as recited in claim 8, wherein the content object refers to a first set of items, the first set of items including the item, and wherein the method further includes:
identifying, using the extraction technique, a first set of item identifiers, each item identifier in the first set of item identifiers corresponding to a first item in the set of first items; and
querying the hierarchical item library with the first set of item identifier, the hierarchical item library identifying, wherein the query response or another query response identifies a procedure type corresponding to each first item in the set of first items.

12. The computer-implemented method for querying hierarchical data structures to identify related items as recited in claim 11, further comprising:
generating a fuzzy inference that the content object relates to a particular procedure type based on the procedure type corresponding to each of multiple first items in the set of first items.

13. The computer-implemented method for querying hierarchical data structures to identify related items as recited in claim 8, wherein the hierarchical item library is dynamic and repeatedly adjusted based on queries.

14. The computer-implemented method for querying hierarchical data structures to identify related items as recited in claim 8, further comprising transmitting the output to another device.

15. A computer-program product tangibly embodied in a non-transitory machine-readable storage medium, including instructions configured to cause one or more data processors to perform actions including:
accessing a content object that refers to a first item;
identifying, using an extraction technique, a first item identifier corresponding to the first item;
querying, using one or more processors, a hierarchical item library with the first item identifier, the hierarchical item library identifying:
a set of procedure types; and
for each procedure type in the set of procedure types:
a set of item types;
for each item type in the set of item types, one or more item characteristics or item identifiers; and
identifying, as a result of using machine learning, at least one item type in the set of item types as indicative of a particular procedure type in the set of procedure types;
receiving a query response that identifies:
a type of item for the first item;
a procedure type in the set of procedure types; and
a second item identifier associated with the procedure type; and generating an output that identifies a second item that is associated with the second item identifier.

16. The computer-program product for querying hierarchical data structures to identify related items as recited in claim 15, wherein the second item is of the type of item for the first item such that both the first item and the second item are of a same type.

17. The computer-program product for querying hierarchical data structures to identify related items as recited in claim 15, wherein the query response indicates that a weight of an association between the second item and the procedure type is stronger than a weight of an association between the first item and the procedure type.

18. The computer-program product for querying hierarchical data structures to identify related items as recited in claim 15, wherein the content object refers to a first set of items, the first set of items including the item, and wherein the actions further include:

identifying, using the extraction technique, a first set of item identifiers, each item identifier in the first set of item identifiers corresponding to a first item in the set of first items; and querying the hierarchical item library with the first set of item identifier, the hierarchical item library identifying, wherein the query response or another query response identifies a procedure type corresponding to each first item in the set of first items.

19. The computer-program product for querying hierarchical data structures to identify related items as recited in claim 18, wherein the actions further include:

generating a fuzzy inference that the content object relates to a particular procedure type based on the procedure type corresponding to each of multiple first items in the set of first items.

20. The computer-program product for querying hierarchical data structures to identify related items as recited in claim 15, wherein the hierarchical item library is dynamic and repeatedly adjusted based on queries.

* * * * *